United States Patent
Long, Jr. et al.

(10) Patent No.: US 6,274,190 B1
(45) Date of Patent: Aug. 14, 2001

(54) METHOD OF COATING PARTICULATE MATERIAL

(75) Inventors: Richard L. Long, Jr.; Donald E. Barber, both of Ames, IA (US)

(73) Assignee: Coating Machinery Systems, Inc., Ames, IA (US)

( * ) Notice: Subject to any disclaimer, the term of this patent is extended or adjusted under 35 U.S.C. 154(b) by 1201 days.

(21) Appl. No.: 08/697,339

(22) Filed: Aug. 22, 1996

Related U.S. Application Data

(62) Division of application No. 08/350,229, filed on Dec. 6, 1994, now Pat. No. 5,567,238.

(51) Int. Cl.[7] .................. A61J 3/00; B01J 13/00
(52) U.S. Cl. ............... 427/2.15; 427/2.18; 427/4; 427/213.31; 427/348; 427/420; 427/424
(58) Field of Search ............... 427/2.15, 4, 2.18, 427/213.31, 348, 424, 420

(56) References Cited

U.S. PATENT DOCUMENTS

| | | | |
|---|---|---|---|
| 2,799,241 | 7/1957 | Wurster | 118/24 |
| 3,533,829 | 10/1970 | Quanquin | 117/62.2 |
| 3,894,508 | 7/1975 | Burgess | 118/19 |
| 4,640,218 | 2/1987 | Motoyama et al. | 118/19 |
| 4,808,424 | 2/1989 | Wadell | 426/289 |
| 5,299,366 | 4/1994 | Maier et al. | 34/57 |
| 5,470,603 | * 11/1995 | Staniforth et al. | 427/2.18 X |

* cited by examiner

Primary Examiner—Bernard Pianalto
(74) Attorney, Agent, or Firm—Zarley, McKee, Thomte, Voorhees & Sease

(57) ABSTRACT

An apparatus for coating seeds and particulate material includes an elongated tray operably mounted on a support frame with a motor for oscillating the tray to move particulate material from a rearward end to a forward end therealong. The tray includes a perforated support surface with a saw-toothed cross-sectional shape such that the particulate climbs the inclined tread of each sawtooth and drops from the forward end of one tread to the rearward end of an adjacent tread to form a "curtain". A plurality of spray nozzles are located over the tray to direct coating solution onto the seeds as they move along the tray. Preferably, the nozzles direct spray towards the curtain of falling seeds between the treads. An upper housing on the support frame includes an air plenum which directs air downwardly onto the seeds on the support surface and through the perforated support surface to a second air plenum formed under the support surface. A flexible seal connects the tray to the upper housing to form an air seal yet permit oscillating movement of the tray. An exhaust fan is connected to the second air plenum to exhaust air from the coating apparatus and create a negative pressure within the coating apparatus. Preferably, air provided to the housing is heated, to enhance drying of the coating sprayed on the particulate material.

11 Claims, 3 Drawing Sheets

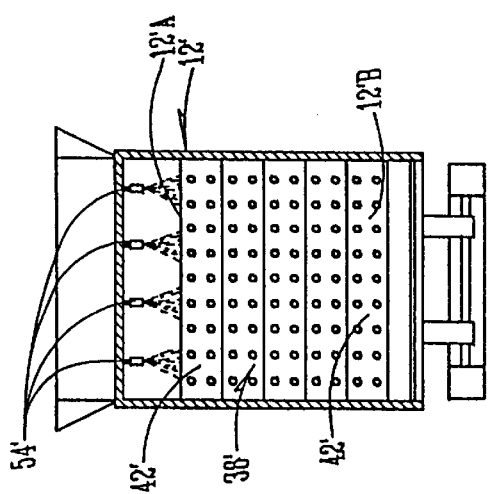
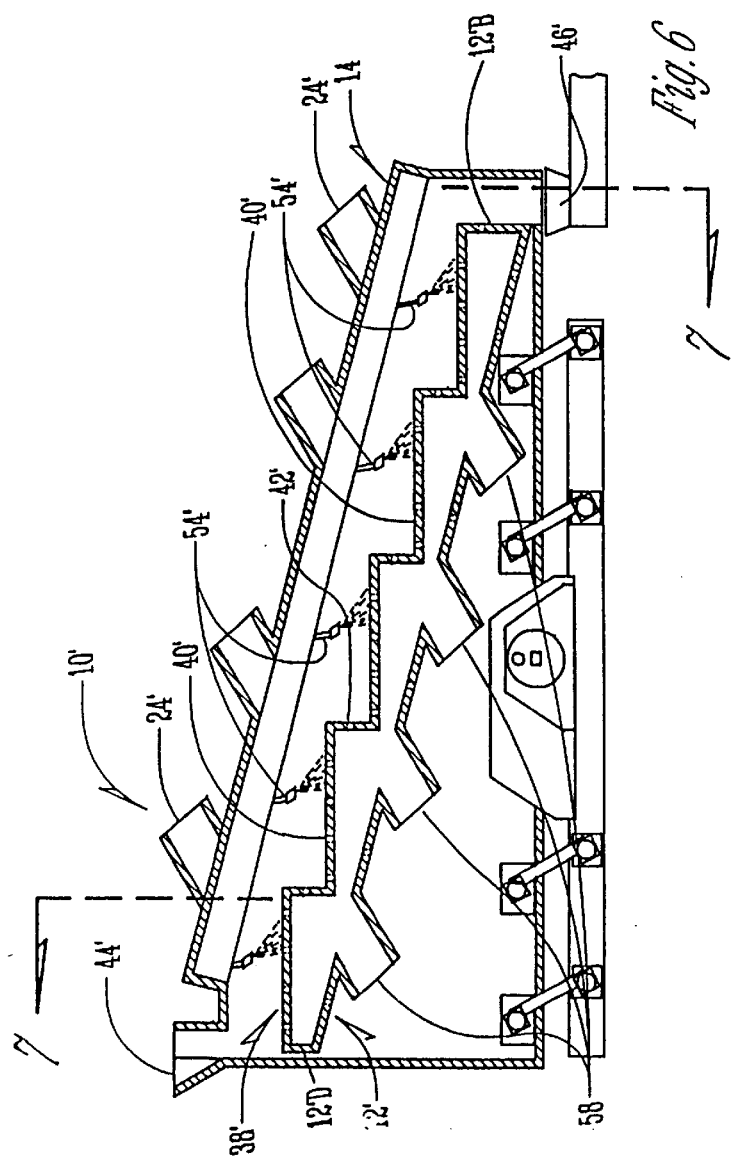

METHOD OF COATING PARTICULATE MATERIAL

This is a divisional of application Ser. No. 08/350,229 filed on Dec. 6, 1994, now U.S. Pat. No. 5,567,238.

TECHNICAL FIELD

The present invention relates generally to apparatus for coating or pelletizing particulate, and more particularly to an improved seed coating apparatus having interchangeable oscillating air permeable trays.

BACKGROUND OF THE INVENTION

It has been known for many years to coat small particles, such as seeds and pharmaceutical products. Generally, a coating which increases the weight of the seed up to 25% is defined as a film coating. A coating which increases the weight of the seed more than 25% is referred to as pelletizing. Pelletizing provides uniformity of size to the particles. Depending on the extent of coating applied, pelletizing may provide a spherical shape to the particles which are normally elongated or irregularly shaped.

There are three primary reasons for providing a coating to such particles. First, a protective coating is often applied to seeds so as to prevent dust-off of prior treatments that have been applied. For example, a film of biological material may be applied to the seed to increase the viability of the seed, and a protective coating is needed to prevent the film from being worn away from the seed during handling. The protective coating allows for a reduction in the amount of film treatment that needs to be applied, thus reducing costs to the seed company. The protective coating also increases the effectiveness of the film treatment by encapsulating the film on the seed. Also, the protective coating reduces environmental hazards of the film treatment.

Another purpose of providing a coating to seeds and small pharmaceutical products is to increase the size of the particle, particularly for seeds which are too small to be mechanically planted. Such an increase in size allows small seeds to be planted mechanically, rather than manually, thereby resulting in significant labor savings, both during the planting and by eliminating manual thinning. Mechanical planting also reduces the seed population required for planting, thereby providing further cost savings.

A third benefit provided by seed coatings is to increase the visibility of the seeds during planting. Therefore, more accurate and less wasteful planting results.

In prior art pelletizing operations, a binder material in a solution was applied by spray, and then a bulking agent, such as clay or wood fibers, was manually applied to the seeds. After the two-step binding and bulking operations were completed, the coated seeds were then taken to an over to bake dry. Thus, the prior art multiple-step process was slow, time consuming, and labor intensive.

SUMMARY OF THE INVENTION

Therefore, a primary objective of the present invention is the provision of an improved method and means for coating particulate material, such as seeds.

Another objective of the present invention is the provision of a method and means for continuously coating seeds, wherein the coating solution is applied and dried on an oscillating bed.

A further objective of the present invention is the provision of a method and means for coating seeds wherein multiple layers of different coatings can be applied to the seeds in a continuous process.

Still another objective of the present invention is the provision of a method and means for continuously pelletizing seeds wherein a binder and bulking agent are applied simultaneously in a solution.

Yet another objective of the present invention is the provision of a continuous pelletizing machine having an oscillating bed which is vented for substantially instantaneous drying of the seeds as the seeds are coated.

Still another objective of the present invention is the provision of a method and means for continuously coating particulate material wherein the flow rate of the material through a coating chamber is selectively adjustable by the use of interchangeable oscillating beds or trays.

Yet another objective of the present invention is the provision of a method and means for coating particulate material in an oscillating bed chamber which is maintained at a negative pressure.

A further objective of the present invention is the provision of a means for continuously coating particulate material which is economical to manufacture, and efficient and durable in use.

These and other objectives will become apparent form the following description of the invention.

The apparatus for coating seeds and particulate material of the present invention includes an elongated tray operably mounted on a support frame with a motor for oscillating the tray to move particulate material from a rearward end to a forward end therealong. The tray includes a perforated support surface with a saw-toothed cross-sectional shape such that the particulate climbs the inclined tread of each sawtooth and drops from the forward end of one tread to the rearward end of an adjacent tread to form a "curtain". A plurality of spray nozzles are located over the tray to direct coating solution onto the seeds as they move along the tray. Preferably, the nozzles direct spray towards the curtain of falling seeds between the treads. An upper housing on the support frame includes an air plenum which directs air downwardly onto the seeds on the support surface and through the perforated support surface to a second air plenum formed under the support surface. A flexible seal connects the tray to the upper housing to form an air seal yet permit oscillating movement of the tray. An exhaust fan is connected to the second air plenum to exhaust air from the coating apparatus and create a negative pressure within the coating apparatus. Preferably, air provided to the housing is heated, to enhance drying of the coating sprayed on the particulate material.

BRIEF DESCRIPTION OF THE DRAWINGS

FIG. 6 is a vertical sectional view through a second embodiment of the invention, and;

FIG. 7 is a sectional view taken at lines 7—7 in FIG. 6.

DESCRIPTION OF THE PREFERRED EMBODIMENT

Figure 1:
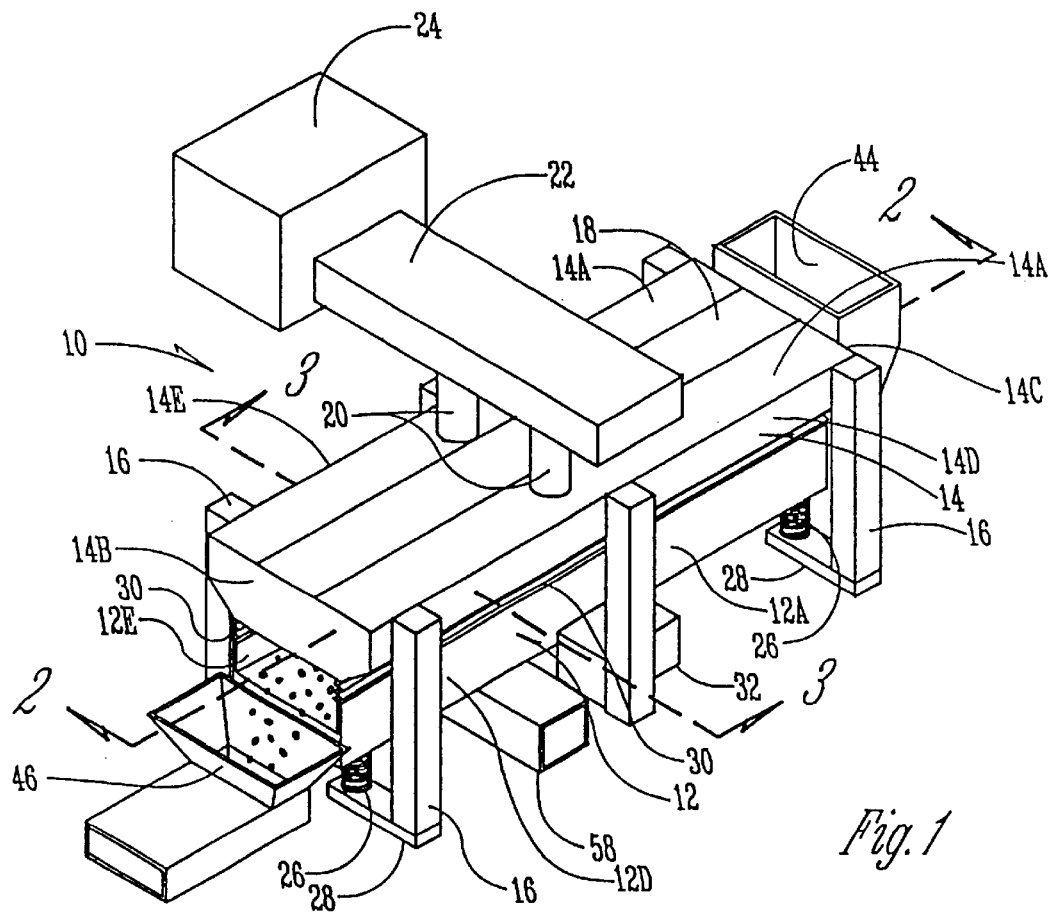
FIG. 1 is a perspective view of the seed coating apparatus of the present invention.

Referring now to the drawings, in which similar or corresponding parts are identified with the same reference numeral, and more particularly to FIG. 1, the seed coating apparatus of the present invention is designated generally at 10 and includes an oscillating and interchangeable tray 12 operably supported below a housing 14, which provides air and the coating material for pelletizing seed passing through apparatus 10.

Figure 2:
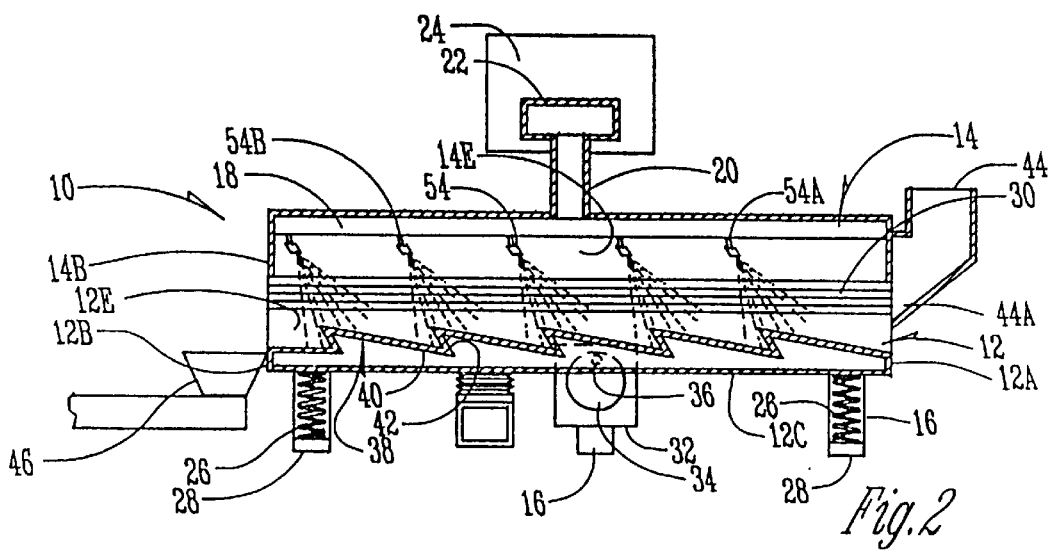
FIG. 2 is a sectional view taken at lines 2—2 in FIG. 1.
Figure 3:
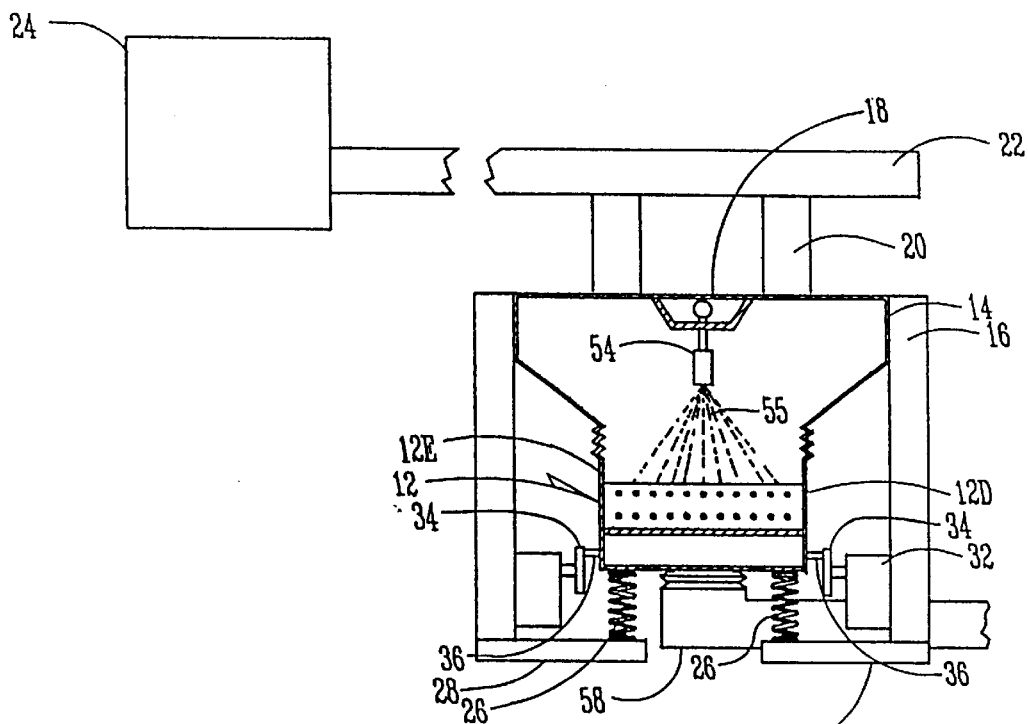
FIG. 3 is a sectional view taken at lines 3—3 in FIG. 1.

Referring now to FIGS. 1–3, housing 14 is supported above the ground on legs 16, and includes a top 14a, a forward end 14b, a rearward end 14c and opposing longitudinal sides 14d and 14e. A spray manifold housing 18 is mounted to housing top 14a and disposed from the forward end to the rearward end generally centrally between housing sides 14d and e. A pair of air intake tubes 20 are mounted to housing top 14a and connected to an air intake duct 22 extending from air source 24, to provide heated air to housing 14.

Tray 12 includes a rearward inlet end 12a, a forward outlet end 12b, a bottom 12c and opposing longitudinal side walls 12d and 12e. Tray 12 is supported on springs 26 which are mounted to an inwardly projecting foot 28 on each support leg 16, to permit oscillating movement of tray 12 relative to support legs 16 and upper housing 14. A rubber boot seal 30 extends between the upper edges of longitudinal sides 12d and 12e of tray 12 and the lower edges of longitudinal sides 14d and 14e of housing 14, to direct air flow from within housing 14 into tray 12. A motor 32 is mounted to an intermediate leg 16, and is operable to rotate a drive wheel 34 which is eccentrically mounted to tray 12 via a drive shaft 36 as shown in FIG. 2. Thus, activation of motor 32 will cause an oscillating force to be applied to tray 12, moving the tray in both a vertical direction and a horizontal direction parallel to the longitudinal axis of tray 12.

A particulate support surface 38 is mounted in said tray 12 between the tray side walls 12d and 12e, and extending from the forward end 12b to the rearward end 12a, spaced above tray bottom 12c. Support service 38 is formed of an air permeable material, such as a perforated sheet, and is formed with a plurality of inclined treads 40 and declined risers 42, to form a general sawtooth pattern in longitudinal cross-section, as shown in FIG. 2. The support surface 38 is interchangeable, thereby providing a tray 12 with a variety of potential tread slopes and lengths, for the particular material being coated with coating apparatus 10. The oscillating movement of tray 12 causes seed, or other particulate, on the support surface 38 to climb the inclined tread surfaces 40, so as to continuously advance from the rearward end 12a to the forward end 12b of tray 12. An input hopper 44 is mounted on the rearward end 14c of housing 14, and has an outlet 44a at the lower end directing seed within the hopper to the rearward end of support surface 38 of tray 12. Similarly, a receiving hopper 46 is located at the forward end of support surface 38 to receive coated particulate and convey the particulate away from coating apparatus 10.

Figure 4:
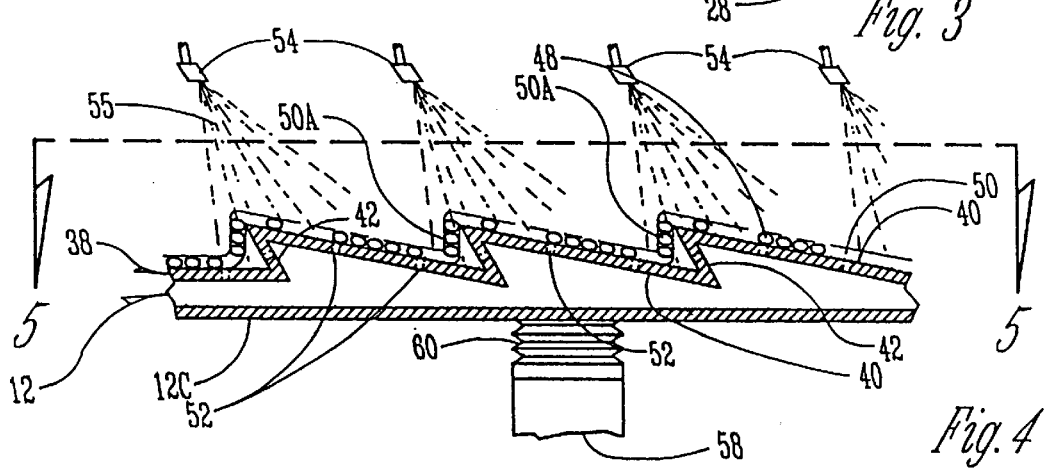
FIG. 4 is an enlarged view of a portion of FIG. 2 within the coating chamber of the apparatus.

Referring now to FIG. 4, an enlarged portion of support surface 38 of tray 12 is enlarged to show the flow of seeds 48, or other particulate, therealong. As noted above, the oscillating movement of tray 12 causes seed 48 to advance longitudinally forwardly along support surface 38, forming a generally uniform layer 50 of particulate, shown in broken lines in FIG. 4. Because the perforations 52 in support surface treads and risers 40 and 42 are smaller than the particulate 48, air will flow around particulate 48 and through the particulate layer 50, to quickly dry any liquid coating sprayed on the particulate 48.

It can be seen that particulate 48 will fall from the upper, or forward, end 40a of each tread 40, vertically downwardly forming a generally vertical "curtain" 50a, of particulate. A plurality of spray nozzles 54 are pivotally mounted from the manifold housing 18 (as shown in FIGS. 2 and 3), and oriented to direct the spray 56 generally towards the curtain 50a of particulate 48. Because of the speed at which the coating sprayed on particulate 48 will dry, due to the air flow through perforated support surface 38, it is possible to apply different coatings from the various spray nozzles 54. Thus, as shown in FIG. 2, a forwardly located spray nozzle 54a may apply a coating of biological material to increase seed dryability, rearward nozzle 54b may apply a second coating of protective material to reduce wear of the first coating of biological material.

Figure 5:
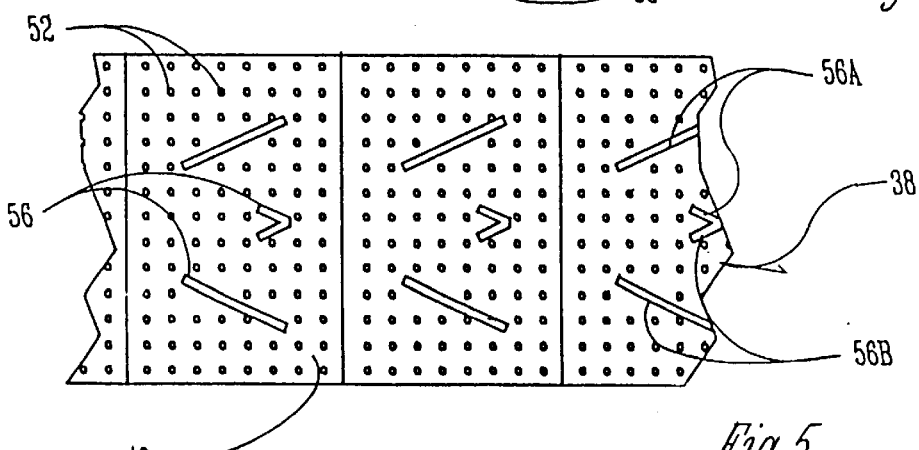
FIG. 5 is a sectional view taken at lines 5—5 in FIG. 3.

Referring now to FIG. 5, a plurality of baffles 56 project from the upper surface of support surface 38 to divert flow of particulate on the support surface, and thereby thoroughly mix the particulate material as it progresses along support surface 38. Preferably, baffles 56 are oriented at an angle relative to the direction of flow of the particulate, between 0° and 45°, with a plurality of first baffles 56a oriented in one direction relative to particulate flow and a second plurality of baffles 56b oriented at an angle opposite baffles 56a, to cause particulate to move transversely on support surface 38 as well as in the longitudinal direction of flow.

Referring now to FIGS. 2 and 3, an exhaust vent 58 is mounted in the bottom 12c of tray 12 to exhaust air which has flowed from housing 14 through the perforations and support surface 38 and into tray 12. Exhaust vent 58 is preferably connected with a flexible boot seal 60 to permit oscillating movement of tray 12 without requiring movement of vent 58, as shown in FIG. 4. An exhaust fan within exhaust vent 58 may be provided so as to create a negative pressure within coating apparatus 10. In addition, air source 24 may be provided with a heater so as to provide heated air to enhance drawing of coatings sprayed on the particulate.

Referring now to FIGS. 6 and 7 a second embodiment of the invention is designated generally at 10' and shown in a generally schematic form with an input hopper 44' at an upper end and an output hopper 46' at an opposing forward and lower end. In the second embodiment, upper housing 14' includes a plurality of spray nozzles 54 oriented longitudinally over an oscillating seed tray 12 having a perforated support surface 38', extending from a rearward end 12'a of tray 12 to a forward end 12'b. While the tray 12 of the first embodiment of the invention was oriented generally horizontally, tray 12' of the second embodiment is in a sloped orientation, sloping downwardly from the rearward end 12'a to the forward end 12'b. Because of the sloped orientation of tray 12', each tread 40' of support surface 38', is generally horizontal, and each riser 42' is generally vertical. Thus, support surface 38' forms a general stair step pattern from tray rearward end 12'a to tray forward 12'b.

As shown in FIG. 7, spray nozzles 54' preferably include a plurality of nozzles extending transversely as well as longitudinally, to fully cover the transverse width of support surface 38.

Whereas the invention has been shown and described in connection with the preferred embodiments thereof, many modifications, substitutions and additions may be made which are within the intended broad scope of the appended claims.

We claim:

1. A method of coating particulate material, comprising:
   placing particulate material to be coated on an elongated tray having opposite inlet and outlet ends and a support surface with alternating treads and risers thereon and perforations therethrough substantially covering at least the tread between the inlet and outlet ends, oscillating the tray to cause the material to traverse the treads and risers as the material moves from the inlet end to the outlet end of the tray;

spraying a layer of liquid coating solution onto the material without electrostatic bonding as the material moves along the tray; and directing air around the coated material and then through the perforations to enhance drying of the solution on the material without electrostatic bonding.

2. The method of claim 1, wherein the treads have opposite upper and lower ends, and risers have lower ends which are recessed with respect to the adjacent tread such that the tread upper ends overhang adjacent tread lower ends, whereby the material falls and forms a curtain from the upper end of each tread to the lower end of an adjacent tread.

3. The method of claim 2, wherein the spraying step includes the step of directing the coating solution on a falling curtain of material.

4. The method of claim 1, further comprising depositing a second layer of coating solution onto the material after the step of directing air onto the material.

5. The method of claim 1, further comprising the step of mixing the material as it is moved longitudinally along the tray.

6. The method of claim 1 wherein the movement of material along each tread is substantially free from gravity flow.

7. The method of claim 1 wherein the treads are inclined, and the oscillation causes the material to climb the inclined treads.

8. The method of claim 1 wherein the solution is bonded to the material while being free from heat fusing.

9. The method of claim 1 wherein the tray is oriented substantially horizontally.

10. The method of claim 1 wherein the tray is inclined downwardly from the inlet end to the outlet end.

11. The method of claim 1 wherein the material forms a curtain while falling over the risers.

* * * * *